US010817917B2

(12) United States Patent
Andrews et al.

(10) Patent No.: US 10,817,917 B2
(45) Date of Patent: Oct. 27, 2020

(54) SYSTEM AND METHOD FOR MANAGING ELECTRONIC BOOK CONTENT

(75) Inventors: Raefer Andrews, Laguna Niguel, CA (US); Alfred Adams, Rockville, MD (US)

(73) Assignee: YourKnow Inc., Laguna Niguel, CA (US)

( * ) Notice: Subject to any disclaimer, the term of this patent is extended or adjusted under 35 U.S.C. 154(b) by 149 days.

(21) Appl. No.: 13/448,082

(22) Filed: Apr. 16, 2012

(65) Prior Publication Data
US 2013/0103525 A1    Apr. 25, 2013

Related U.S. Application Data

(60) Provisional application No. 61/548,923, filed on Oct. 19, 2011.

(51) Int. Cl.
*G06Q 30/00* (2012.01)
*G06Q 30/06* (2012.01)

(52) U.S. Cl.
CPC .................... *G06Q 30/06* (2013.01)

(58) Field of Classification Search
CPC ............... G06Q 30/00; G06Q 30/0601; G06Q 30/0623; G06Q 30/0641
See application file for complete search history.

(56) References Cited

U.S. PATENT DOCUMENTS

| | | | | |
|---|---|---|---|---|
| 2003/0018543 A1* | 1/2003 | Alger | ................. | G06Q 30/0625 705/26.1 |
| 2009/0217196 A1* | 8/2009 | Neff | .................... | G06F 16/9535 715/799 |
| 2010/0004944 A1* | 1/2010 | Palaniappan | .......... | G06Q 10/10 705/1.1 |
| 2011/0261030 A1* | 10/2011 | Bullock | .............. | G06F 3/04842 345/204 |
| 2012/0240085 A1* | 9/2012 | Sim | ......................... | G09B 5/14 715/864 |
| 2013/0013991 A1* | 1/2013 | Evans | ............ | H04N 21/440236 715/206 |

OTHER PUBLICATIONS

Godwin-Jones, Robert. "Blogs and wikis: Environments for online collaboration." Language learning & technology 7.2 (2003): 12-16. (Year: 2003).*

* cited by examiner

*Primary Examiner* — Christopher B Seibert
(74) *Attorney, Agent, or Firm* — Steptoe & Johnson LLP

(57) ABSTRACT

A system and method for managing book content includes a portal for managing users and files including book content.

13 Claims, 1 Drawing Sheet

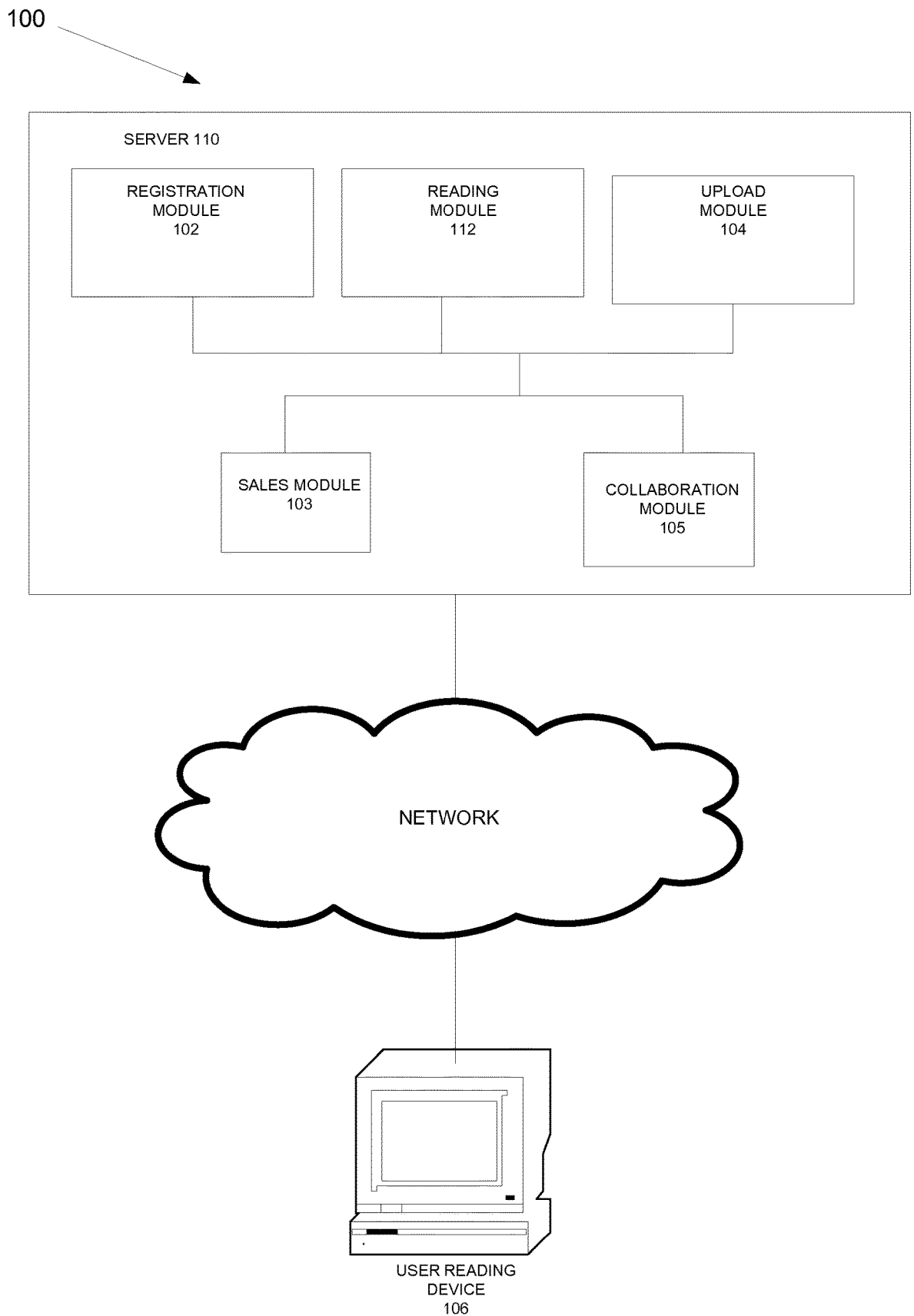

SYSTEM AND METHOD FOR MANAGING ELECTRONIC BOOK CONTENT

PRIORITY CLAIM

This application claims priority to U.S. Provisional Application No. 61/548,923, filed Oct. 19, 2011, which is incorporated by reference in its entirety.

TECHNICAL FIELD

The present invention is directed to a system and method for managing book content and access.

BACKGROUND

Traditional brick and mortar libraries are effective in providing physical access to books and book content to individuals.

SUMMARY

A system and method for managing electronic book content that meets the needs of publishers and consumers can be realized using a portal system with certain controls. In one aspect, a system for managing access to book content can include a server module for containing a plurality of files including book content, a registration module for collecting user information for a plurality of users, a reading module for providing access to each user to selected book content for visualization from the server, and an upload module for transferring files including book content to the server.

In certain embodiments, the system can include a collaboration module for permitting at least two of the users to work together and interact in the portal.

In other embodiments, the system includes a sales module for permitting purchase of a book accessed through the portal.

In another aspect, a method of creating a personalized book can include registering a plurality of users in a portal, uploading a plurality of files including book content, storing the plurality of uploaded files including book content accessible by the portal, and providing viewing access to a user to a selected uploaded file.

In certain embodiments, registering can include assembling user information associated with each user. In some circumstances, the method can include permitting purchase of a book of the portal, permitting collaboration between users, or grouping the users.

The plurality of users can include a publisher. The file has a format type of .epub, .pdb, .azw, .aeh, .lrf, or .lrx. In certain embodiments, the file can be an ebook.

Other objectives, features, and advantages of the invention will be more readily understood upon consideration of the following detailed description of the invention, taken in conjunction with the accompanying drawings, and with the claims.

BRIEF DESCRIPTION OF THE DRAWINGS

The present invention is further described in the detailed description which follows, in reference to the noted plurality of drawings by way of non-limiting examples of certain embodiments of the collaboration portal for users to share digitally formatted information, in which like numerals represent like elements throughout the several views of the drawings, and wherein:

FIG. 1 illustrates an exemplary portal system and its components.

DETAILED DESCRIPTION

A detailed explanation of the system and method according to the preferred embodiments of the collaboration portal for users to share digitally formatted information are described below.

As one skilled in the art will appreciate, embodiments of the collaboration portal for users to share digitally formatted information may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

The various techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Book content and access can be enhanced by a portal that allows users to access information and collaborate in a networked or on-line environment. Users can have unlimited access to all digitally stored information in the portal. Ultimately, one of the goals of the portal is to create access for every book or literary work in the World in an online environment so that all users of the portal can access and read the materials on demand.

Another goal of the portal is to create educational impact. For example, education institutions can use the portal to create collaboration forums for students, and make available electronic copies of class textbooks for students to access online and in-class. Through use of the portal, students can avoid having to carry bulky hard copy textbooks to class. An electronic reader device that is web-enabled and has internet access capabilities can allow a student to access a copy all current text books for his/her class on demand through the portal.

Another goal of the portal is to provide social network impact. In this use of the portal, global users can share and discuss literary works and writings, and collaborate globally on authorship of new works.

The portal can be managed and controlled in a straightforward manner. For example, the user interface can be developed using a combination of open source software tools and other software development materials. A graphical user interface (GUI) front end for the portal can be created using a combination of ASP.NET and PHP development tools. The back end of the portal can be a SQL database such as MYSQL open source. The web interface plugins for the portal's group collaboration can be customized open source based modules. The portal can utilize vendor hosting options for its network infrastructure and user data collection.

The portal can run on a virtual server technology in the design and implementation of a server farm. The server farm can utilize Microsoft's Hyper V, or VMware, Virtual Server management systems. The server farm can have the ability to be scalable on demand and without any downtime, using existing Virtual Server management or data redundancy technologies. The server system can be designed to have 99.99% availability, by utilizing instantaneous data replication and co-location strategies. Consequently, the server systems can have continuous redundancy to maximize stability and disaster recovery options. Data can be compressed using data de-duplication techniques, and instantaneously replicate with parallel server systems at co-locations throughout the globe. Electronic book readers and other mobile electronic devices can communicate with the portal via the Internet using a web browser interface with user identification and password authentication to the portal. Connecting and authentication to the portal can allow a user to push files (eBooks or data) to the portal database system via the network. User data can be parsed and reformatted by algorithms and then inserted into a database structure.

In certain circumstances, during material upload to the portal, data having copyrighted digital rights markers cannot be uploaded for users to reference. By referencing, users can read portal content but are not able to download or own specific content housed on the portal.

A collaboration portal for users to share digitally formatted information can include at least one server, a registration module, a reading module, and an upload module. The collaboration portal optionally can include, independently, a collaboration module, a sales module, a redirection module and a download module.

The portal can require a fee to access the content of the portal. In other embodiments, the portal can be freely accessed by users. Users can become members by registering. All users, including non-members, will have access to the portal menu items to show the general features of the portal. A non-member user can be permitted to search the entire portal. In certain embodiments, upload functions can be reserved for registered users. A non-member user can be permitted to read all unrestricted materials, such as public domain documents or works available in the portal. The portal can operate in any of major language, for example, one of seventy different languages.

The registration module is configured to allow users to sign up to participate in the collaboration portal. The users of the collaboration portal can register as a regular member or a publisher member. The regular member has authorization to read, share, collaborate, upload material such as electronic books, and participate in all portal activities. The regular member can be authorized to upload electronic books and literary works or other readable materials that are not protected by copyright. The publisher member has authorization to upload material such as electronic books and literary works or other readable materials that are protected by copyright and grants sufficient rights to the regular members of the collaboration portal to allow the regular member to read the material. The publisher member also can have authorization to facilitate a download or sell the material to regular members directly or through a re-direction process to a commercial website.

In the registration module, the user can set up initial user information and authentication, including setting up password requirements and acknowledgement of portal rules. The portal rules can include requiring one more of compliance with copyright management rules, declarations regarding restrictions in portal use, declarations regarding file requirements, and confirmation of age requirements for participation, as necessary. Each user can create and update their profile. The user profile can include a summary of user history and activities, the last time the user logged in to the portal, the content of the last session with ability to resume at the last reading position, a self assigned avatar and user identification for privacy purposes, number of files uploaded and shared to date, the number of associated collaboration groups, and personal information that the user can maintain. When the user is a publisher, registration can include a verification step to confirm that the user can have access to publisher rights.

The reading module is the portion of the portal that allows viewing of all or a portion of the material on the web browser-enabled device. Electronic books can be configured to render the material for reading in a true book-publishing format encapsulated in a web browser via the portal. The reading module can access the uploaded files and allows them to be shared with other users via any web browser-enabled device. Suitable devices include personal computers, tablets, phones, smartphones or electronic readers, such a Kindle, Nook, or other e-reader.

A registered user can have upload capabilities. In certain embodiments, the user must be registered to have upload capabilities. The upload module permits users to upload electronic files that can be one of many format file types including but not limited to .epub, .pdb, .azw, .aeh, .lrf, or .lrx files. The uploaded files are housed or stored on the server.

When the user is not a publisher, the user can be permitted to upload and share user writings and works. The user writings and works can be materials that are personally authored by the user. The user can be writer, scholar, or innovator. In certain embodiments, a user can be required to separately acknowledge a non-copyright infringement policy for each upload uploading any information to be shared with the portal community.

When the user is a publisher, in addition to the features described for all users, the publisher verification information can include the following: an electronic material category, the author for each material, publication particulars including publication date, copyright ownership acknowledgement, Point of Contact (POC) name, POC Phone Number, POC mailing and email Address, publisher corporate address, purchase information, "Buy Book" ecommerce link for book purchase, material image, or material description, or a combination thereof. Publisher users can upload files free of digital rights management features, or grant other license controls to the uploaded material, such electronic books or literary works. The publishers can establish capabilities to purchase the material, for example, through a "Buy Book" function that can redirect links to ecommerce websites for the sale and download of material to an interested user. The electronic material category can be electronic books categorized as factual, fictional, educational, or literary. Publishers, like other users, will have to acknowledge a non-copyright infringement policy in order to participate in the portal and before uploading any information to be shared with the users of the portal.

The collaboration module can allow a plurality of users to work together and interact in the portal. A registered user requests access to a group. In one embodiment, the user provides permission for others to view status of the user regarding login on the portal. The user can control who can view the status, or can allow free viewing of status. The collaboration module can also allow groups to be formed that users can be invited to join by a member of the group or administrator of the group, or can join without invitation. In certain circumstances, collaboration groups can be designated private or open to public. Private groups can have a minimum or maximum age requirement, for example, no older than 18 years of age, or less than 18 years of age. In certain circumstances, the content of a private group can be viewed in as an overview or summary. If a group is designated public, its content will be available for all users to review, however only assigned group members will be able to participate in that specific group's activities.

The group administrator can establish the ability for group members to see the identification name of the other group members and presence of the group member (for example, login status) when collaborating in a group setting. The monitoring of group members can be achieved through a "Group Friends" identification process. This identification process can reference information from a user's registration profile, including, but not limited email and IP addresses. Users can create groups in any category available on the portal. In certain embodiments, each group can have at least one administrator or creator. A group administrator or creator can be responsible for granting access to requested users to any user group of the portal and can delegate additional administrative rights to one or more other users in the group.

In the collaboration module, the users can collaboratively author books, writings or other works in various categories and for particular purposes, for example, environmental, social or political issues. Collaborating users can create collaborative groups within which books, poems, song lyrics, writings or other works can be authored. A collaborative group can be created by a group administrator. The collaborating users can utilize a web-based authoring tool that can manage collaborative authoring. The web-based collaborative tool can be an open source customized tool. Collaboration users can choose from a selection of authoring approaches including sequential participation by passing control of authorship from one group member to another. Alternatively, an authoring approach of non-sequential participation, which can be regulated or controlled by a group administrator and a designated collaborator.

For example, in some circumstances, users from education and business institutions will be able to create Collaboration Forums in various categories and purpose. The Forum can be established to stimulate creativity and generate targeted content. In other embodiments, the portal can be Section 508 compliant, to ensure access for people with vision impairments who rely on various electronic products such as screen readers, to access computer-based information, and translate what is on a computer monitor into automated audible output and the use of text labels or descriptors for graphics and certain format elements. The sales module, if present, can establish a commercial transaction that allows a user to buy a personal copy of the material. The sales module can accept payment directly or indirectly from the user. In certain other embodiments, rather than sell material directly to the user, the sales module can include a redirection module that sends the user to a separate location to purchase the material. For example, the redirection module can send the user to a retail location to make the purchase. Once the sale is complete, a download module provides the material that was purchase for download to the viewing device.

Other embodiments of the portal can include features that enhance the user experience by providing algorithm that can check the portal contents for document duplication or an algorithm that can check for inappropriate content uploads. The portal can also be enhanced by providing governance policies and procedures and other user compliance requirements that can improve the user experience and provide secure handling of the material on the portal.

Referring to the collaboration portal 100 shown in FIG. 1, in an embodiment, a server 110, a registration module 106, a reading module 102, and an upload module 104. The portal 100 can also include a collaboration module 105, or sales module 112 may comprise a general-purpose computer and can have an internal or external memory for storing data and programs such as an operating system (e.g., iOS, DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer.

In addition, user reading device 106 can be a device configured to provide an image of the material. The device may be or can include a desktop computer, a server, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network, such as network 108, include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs which may be associated with the portal may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server. In this embodiment, it is envisioned that a client computer system, which may be the client device 106, may interact with a browser to select a particular URL, which in turn may cause the browser to send a request for that URL or page to the server identified in the URL. Typically, the server may respond to the request by retrieving the requested page and transmitting the data for that page back to the requesting client computer system, which may be the client device 106 (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented system for managing access to electronic book content comprising:
   a computer-implemented server module for containing a plurality of files including book content on a server including a processor;
   a registration module for collecting user information for a plurality of users to a portal to the server and for creating a profile of data associated with each user, wherein the plurality of users of the collaboration portal register as a regular member or a publisher member, the regular member having authorization to read, share, collaborate, upload material and the publisher member having authorization to upload material such as electronic books and literary works that are protected by copyright and grants sufficient rights to the regular members of the collaboration portal to allow the regular member to read the material;
   an electronic reading module for providing access to each user to selected electronic book content having restricted publisher rights for user visualization on a device from the server without downloading the electronic book content to the user the module verifying that the user can have access to publisher rights for the selected book by checking user information on the server and the profile;
   an upload module for transferring files including electronic book content to a portal database of the server for the verified user to allow the user to view the electronic book content and to associate with the profile of the user; and
   a collaboration module for permitting at least two verified users to share digitally formatted information via a portal having a graphical user interface front end, work together and interact in the portal having the graphical user interface front end containing digitally stored information, use a web-based authoring tool that can manage collaborative authoring and generate targeted content, while permitting data for the history and activities for each user while working together and interacting in the portal having a graphical user interface front end in the collaboration module to be summarized and associated with each user's profile, creating a summary of user history and activities for access in the profile of each user and a sales module for permitting purchase of a book accessed through the portal.

2. The system of claim 1, wherein the plurality of users include a publisher.

3. The system of claim 1, wherein the file has a format type of .epub, .pdb, .azw, .aeh, .lrf, or .lrx.

4. The system of claim 1, wherein the file is an ebook.

5. A computer-implemented method of creating a personalized electronic book, comprising:
   providing an electronic reading module for
   registering a plurality of users in a portal of a computer system by creating a profile of data associated with each user, the portal containing digitally stored information, wherein the plurality of users register as a regular member or a publisher member, the regular member having authorization to read, share, collaborate, upload material and the publisher member having authorization to upload material such as electronic books and literary works that are protected by copyright and grants sufficient rights to the regular members of the collaboration portal to allow the regular member to read the material;
   uploading a plurality of files including electronic book content to a server including a processor to associate with the profile of the user;
   storing the plurality of uploaded files including electronic book content accessible by the portal on the server of the computer system;
   verifying that a user can have access to publisher rights for selected electronic book content having restricted publisher rights by checking user information on the server and the profile providing viewing access to the verified user to a selected uploaded file from the server to a portal database for user visualization on a device without downloading the book content to the user;
   providing a web-based authoring tool that can manage collaborative authoring by permitting collaboration between users via a portal having a graphical user interface front end and generate targeted content;
   permitting collaboration between verified users via the portal having the graphical user interface front end to share digitally formatted information on the server by permitting data for the history and activities for each user while working together and interacting in the portal having a graphical user interface front end in the collaboration module to be summarized and associated with each user's profile and creating a summary of user history and activities for access in the profile of each use;
   and providing a sales module for permitting purchase of a book accessed through the portal.

6. The method of claim 5, wherein registering includes assembling user information associated with each user.

7. The method of claim 5, further comprising grouping the users.

8. The method of claim 5, wherein the book is an eBook.

9. The method of claim 5, further comprising reserving upload functions for registered users.

10. The method of claim 5, wherein the portal menu items are accessible to all users.

11. The method of claim 5, wherein a user is a registered member.

12. The method of claim 5, further comprising providing a registered member the ability to facilitate a download or sell material to other users directly.

13. The method of claim 5, further comprising providing a registered member the ability to facilitate a download or sell material to other users through a re-direction process to a commercial website.

* * * * *